United States Patent
Beatson et al.

(10) Patent No.: US 7,916,907 B2
(45) Date of Patent: Mar. 29, 2011

(54) SYSTEM AND METHODS FOR TRANSFORMING BIOMETRIC IMAGE DATA TO A CONSISTENT ANGLE OF INCLINATION

(76) Inventors: Rodney Beatson, Severna Park, MD (US); Mark A. Kelty, Catonsville, MD (US)

( * ) Notice: Subject to any disclaimer, the term of this patent is extended or adjusted under 35 U.S.C. 154(b) by 0 days.

(21) Appl. No.: 12/627,413

(22) Filed: Nov. 30, 2009

(65) Prior Publication Data

US 2010/0142763 A1    Jun. 10, 2010

Related U.S. Application Data

(63) Continuation of application No. 11/151,412, filed on Jun. 14, 2005, now abandoned.

(60) Provisional application No. 60/579,422, filed on Jun. 14, 2004.

(51) Int. Cl.
*G06K 9/00* (2006.01)

(52) U.S. Cl. ........ 382/119; 382/115; 382/116; 382/123; 382/186; 382/187; 382/188; 382/289; 382/290; 382/293; 382/294; 382/295; 382/296

(58) Field of Classification Search .................. None
See application file for complete search history.

(56) References Cited

U.S. PATENT DOCUMENTS

| | | | |
|---|---|---|---|
| 3,624,293 A | 11/1971 | Baxter et al. | |
| 3,873,770 A | 3/1975 | Ioannou | |
| 4,028,674 A | 6/1977 | Chuang | |
| 4,202,626 A | 5/1980 | Mayer, Jr. et al. | |
| 4,240,065 A | 12/1980 | Howbrook | |
| 4,308,522 A | 12/1981 | Paganini et al. | |
| 4,396,902 A | 8/1983 | Warthan et al. | |
| 4,475,235 A | 10/1984 | Graham | |
| 4,672,182 A | 6/1987 | Hirokawa | |
| 4,771,460 A | 9/1988 | Tamada et al. | |
| 4,803,351 A | 2/1989 | Shigenga | |
| 4,979,225 A * | 12/1990 | Tsujiuchi et al. | 382/165 |
| 5,048,085 A | 9/1991 | Abraham et al. | |
| 5,054,088 A | 10/1991 | Gunderson et al. | |
| 5,101,437 A | 3/1992 | Plamondon | |
| 5,115,107 A | 5/1992 | Crooks et al. | |
| 5,140,107 A | 8/1992 | Crooks et al. | |

(Continued)

FOREIGN PATENT DOCUMENTS

DE    2909899    9/1980

OTHER PUBLICATIONS

Max Kurtz, "Hanbook of Applied Mathematics for Engineers and Scientists", McGraw-Hill, Inc., 1991, pp. 10.34-10.40.

(Continued)

*Primary Examiner* — Vikkram Bali
*Assistant Examiner* — Julian D Brooks

(57) ABSTRACT

Biometric data are obtained through a biometric input device (120) and subsequently pixelated via a pixelator (130). The pixelator (130) creates an image of the biometric data. Via a processing unit (110), a relationship between pixels of a transformed version of the image is asserted. Thus, the biometric data is rotated to a consistent inclination based on the relationship between pixels regardless of an orientation in which the biometric data were captured in the original image. Once the image has been transformed, features of the biometric data may be extracted and either stored in a data storage unit (140) or compared with previously stored feature values for validation of the biometric data.

16 Claims, 4 Drawing Sheets

U.S. PATENT DOCUMENTS

| | | | |
|---|---|---|---|
| 5,150,420 A | 9/1992 | Haraguchi | |
| 5,191,175 A | 3/1993 | Protheroe et al. | |
| 5,195,133 A | 3/1993 | Kapp et al. | |
| 5,223,677 A | 6/1993 | Kapp et al. | |
| 5,225,636 A | 7/1993 | Protheroe | |
| 5,233,547 A | 8/1993 | Kapp et al. | |
| 5,245,139 A | 9/1993 | Protheroe et al. | |
| 5,272,469 A | 12/1993 | Memarzadeh | |
| 5,283,557 A | 2/1994 | Memarzadeh | |
| 5,297,202 A | 3/1994 | Kapp et al. | |
| 5,335,230 A | 8/1994 | Crooks et al. | |
| 5,373,117 A | 12/1994 | Crooks | |
| 5,387,765 A | 2/1995 | Crooks | |
| 5,414,441 A | 5/1995 | Memarzadeh et al. | |
| 5,434,928 A | 7/1995 | Wagner et al. | |
| 5,479,280 A | 12/1995 | Kazurov et al. | |
| 5,539,159 A | 7/1996 | Protheroe et al. | |
| 5,563,381 A | 10/1996 | Crooks et al. | |
| 5,563,403 A | 10/1996 | Bessho et al. | |
| 5,604,802 A | 2/1997 | Holloway | |
| 5,636,291 A | 6/1997 | Bellegarda et al. | |
| 5,680,470 A * | 10/1997 | Moussa et al. | 382/119 |
| 5,745,598 A | 4/1998 | Shaw et al. | |
| 5,825,906 A | 10/1998 | Obata et al. | |
| 5,828,772 A | 10/1998 | Kashi et al. | |
| 5,892,824 A * | 4/1999 | Beatson et al. | 713/186 |
| 6,084,985 A | 7/2000 | Dolfing et al. | |
| 6,157,731 A | 12/2000 | Hu et al. | |
| 6,226,417 B1 | 5/2001 | Yamagata et al. | |
| 6,285,802 B1 * | 9/2001 | Dennis et al. | 382/280 |
| 6,571,002 B1 | 5/2003 | Ogawa | |
| 6,734,998 B2 | 5/2004 | Tsai et al. | |
| 6,882,746 B1 | 4/2005 | Naveen et al. | |
| 2002/0136469 A1 | 9/2002 | Moroo | |
| 2003/0007691 A1 | 1/2003 | Adachi | |
| 2003/0126448 A1 | 7/2003 | Russo | |
| 2003/0210817 A1 | 11/2003 | Hullender et al. | |
| 2004/0170318 A1 | 9/2004 | Crandall et al. | |
| 2005/0089248 A1 | 4/2005 | Zuev et al. | |

OTHER PUBLICATIONS

Robert V. Hogg, et al., "Probability and Statistical Inference", Macmillan Publishing Co., Inc., 1983, 109-116, 448.

"A First Course in Probability Models and Statistical Inference", Spinger-Verlag, 1994, pp. 295-317, 675-677, 693-697.

William Feller, "An Introduction to Probability Theory and Its Applications", vol. 1, 2nd Edition, John Wiley & Sons, Inc., 1957, pp. 199-222.

Malcolm Goldman, "Introduction to Probability and Statistics", Harcourt, Brace & World, Inc., 1970, pp. 225-227.

Xiaohong, W., et al.; "A new method for image normalization"; Proceedings of 2001 International Symposium on Intelligent Multimedia, Video and Speech Processing; May 2-4, 2001; pp. 356-359.

* cited by examiner

SYSTEM AND METHODS FOR TRANSFORMING BIOMETRIC IMAGE DATA TO A CONSISTENT ANGLE OF INCLINATION

RELATED APPLICATION DATA

This application is a Continuation of U.S. patent application Ser. No. 11/151,412, filed 14 Jun. 2005, which is based on U.S. Provisional Patent Application No. 60/579,422, filed 14 Jun. 2004.

BACKGROUND OF THE INVENTION

1. Field of the Invention

The invention described herein is related to image processing of biometric data to compensate for image skew. More particularly, the invention is related to methods and associated systems for transforming biometric data so that features may be extracted consistently therefrom regardless of the original orientation of the biometric data in the image.

2. Description of the Prior Art

In the past decade, vast resources have been put into motion towards improving systems and methods for authenticating persons by automatic means. Machine authentication of persons spans several fields of endeavor, including network security, financial transaction authorization and the electronic execution of binding agreements and legal documents.

The field of biometrics, which utilizes physiological or behavioral phenomena that are particularly unique to an individual, has introduced many systems and methods for authentication, many of which are enjoying some popularity. Biometric data includes fingerprint, iris and face images, and voice and handwriting samples. But, while biometric systems and methods are becoming more prevalent, a greater reliance on the technology has been hampered due to the complex nature of the data metric itself.

One particular problem is that of the inconsistencies in biometric data. Indeed, extracting features from a biometric sample comes with its own complications in implementation, but when variability in the way an individual submits a biometric sample is introduced, consistent extraction of features becomes much more difficult. For example, in handwriting analysis, it is often the case that a signer will enter a sample at a different angle with respect to a previous sample upon which a feature template has been processed and stored for validation purposes. Whereas, to the trained human eye, it is apparent that a slanted version of a handwriting sample originates from the same person that signed a non-slanted version of the sample, automating the extraction of handwriting features to accomplish the recognition task by machine is complicated when the sample is skewed from the orientation on which a template was based.

Previous attempts to rectify images to a common orientation have primarily involved regression techniques to determine a regression line, which is then used as a reference for locating pertinent features for extraction. Examples of this type of technique are disclosed in U.S. Pat. No. 5,563,403 issued to Bessho, et al., U.S. Pat. No. 6,084,985 issued to Doffing, et al., and U.S. Pat. No. 5,892,824 issued to Beatson, et al, the latter patent having common inventorship with the present invention. These methods suffer from the dependency of the extraction process on the angle at which the data was submitted. Thus, key features extracted from the image for biometric verification are more variable and therefore less useful than if the image were rotated to a consistent and repeatable angle of inclination prior to feature extraction.

U.S. Pat. No. 5,828,772, issued to Kashi, et al., discloses normalization of signature data by certain ones of the signature's Fourier descriptors to reestablish the signature data in a common orientation. The normalization disclosed in Kashi, et al. translates the signature by the value of the zero-th, or "D.C." descriptor and scales and rotates the signature according the first Fourier descriptor. However, the normalization described in Kashi, et al. is highly dependent on the sequential ordering of data points in the signature. For example, the rotation angle of the normalization depends on the location of the first point in the sequence with respect to its centroid. This sequential dependency severely limits the applicability of the normalization technique in that not all biometric data are arranged in a sequence. Many types of biometric data, such as that found in fingerprint and iris images, do not have among their properties a start and end point. The Fourier normalization disclosed in Kashi, et al. could not be applied to such non-serialized data. Moreover, because the normalization of Kashi, et al. requires Fourier analysis, it may be too costly to implement on certain platforms.

In light of the prior art, there is an apparent need for a system and associated methods for transforming biometric image data so that features can be consistently extracted therefrom regardless of the angle at which the data was submitted.

SUMMARY OF THE INVENTION

It is an object of the present invention to provide a method for spatially transforming biometric data for submission angle invariant feature extraction. Biometric data are obtained and pixelated to form a biometric image. The biometric data in the image are oriented at a submission angle with respect to a predetermined axis of the image. A statistical relationship between pixels of a transformed biometric image is selected. A transform is applied to the biometric image to relocate the pixels thereof so as to form a transformed biometric image, where the biometric image is rotated to an angle of inclination corresponding to the statistical relationship regardless of the submission angle.

It is a further object of the present invention to provide a method for verifying the validity of biometric data through invariant feature extraction. An input device is provided to obtain biometric data from a user and a storage unit is provided for storing features of the biometric data. A statistical relationship between pixels of a transformed image is selected. A first sample of biometric data is obtained from the user through the input device and the first sample is pixelated to form a first sample image. The first sample image includes a plurality of pixels at a corresponding plurality of pixel coordinates. The first sample is oriented in the image at a first submission angle with respect to a predetermined axis of the first sample image. A transform is applied to the first sample image to produce a first transformed biometric data image, where the first sample is oriented in the first transformed biometric data image at an angle of inclination corresponding to the selected relationship between pixels. Biometric features are extracted from the first transformed biometric image and stored in the storage unit. Subsequently, a second sample of biometric data is received from the user. The second sample is pixelated to form a second sample image. The transform is applied to the second sample image to produce a second transformed biometric data image so that the second sample is oriented in the second rotated biometric data image at the angle of inclination corresponding to the statistical relationship between pixels. Biometric features are extracted from the second transformed biometric data image and compared with the corresponding biometric data stored in the storage unit.

It is yet another object of the present invention to provide a system for spatially transforming biometric data for invariant feature extraction. The system includes an input device operable to obtain biometric data for the user, a pixelator operable to pixelate the biometric data into an image thereof, where the biometric data are oriented in the image at a submission angle with respect to a predetermined axis of the image. The system further includes a data storage unit operable to store features of the biometric data and a code storage unit operable to store sequences of program instructions that, when executed by a processing unit, cause the processor to execute a transformation process to relocate the pixels of the biometric data image so as to achieve an angle of inclination of biometric data corresponding to a statistical relationship between pixels thereof. The system further includes a processing unit coupled to the input device and the code and data storage units. The processing unit is operable to execute the transformation process.

DESCRIPTION OF PREFERRED EMBODIMENTS

In the following description, reference will be made to particular types of biometric data for purposes of describing the invention to the skilled artisan. It is to be understood, however, that the present invention may be used with many different biometric data types, which are not specifically listed or described herein. It should be clear from the following description that among the beneficial features of the present invention is that any biometric data image may be transformed in accordance therewith so as to extract significant features consistently and regardless of the angle at which the biometric data are oriented in the image.

Figure 1:
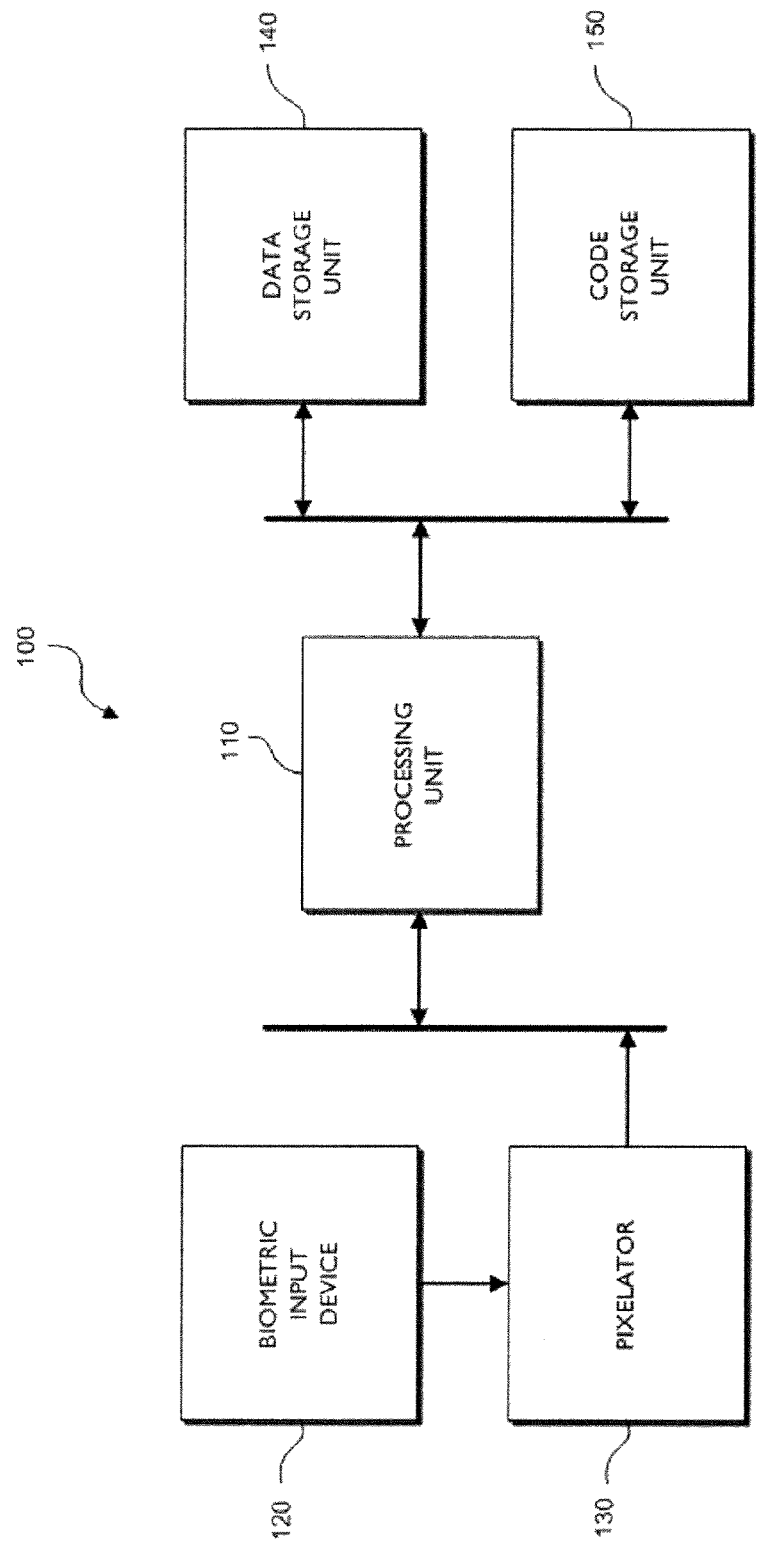
FIG. 1 is a schematic block diagram of an exemplary system configuration for carrying out aspects of the present invention.

Referring now to FIG. 1, there is shown an exemplary system configuration, in simplified form, for implementing the present invention. It is to be understood that the components illustrated may be distributed across system boundaries or may be contained in a single unit. For example, the system 100 illustrated in FIG. 1 may be entirely implemented on a personal digital assistant (PDA). Alternatively, functions of processing unit 110, described in more detail below, may be distributed across many processing units interconnected by a communications network. Alternative implementations of the present invention will be clear to those of skill in the art upon reading the disclosure.

As shown in the Figure, the system 100 includes a biometric input device 120 for obtaining a biometric data sample from a user. Biometric input devices are well known in the art for obtaining a sample of the user's handwriting, a user fingerprint, iris and facial images, and other biometric data. Biometric input device 120 may include a transducer which converts a measurable biometric characteristic into an electrical signal for further processing. Such transducers include means for converting stylus position, pressure, temperature, optical radiance, and other physical qualities into a corresponding electrical signal. In certain implementations, the transducer produces an electrical signal which is proportional to the physical quality being measured.

Biometric input device 120 is coupled to a pixelator 130 which converts the signal from biometric input device 120 into discretely valued quantities corresponding to a coordinate in an image. For purposes of description, a "pixel" as used herein, will refer to one or more values, which may be, for example, real, imaginary, or complex numbers, assigned to a coordinate in an image. A coordinate may be of a spatial coordinate system, a temporal coordinate system, or any other coordinate system, and an image will be used herein to refer to an ordered collection of such pixels. As such, it should be clear that an image need not be a planar array of pixels containing graphic data, which is a common usage of the term. An image, as used herein, may be formed from, for example, stylus position and/or stylus pressure data in a temporal coordinate system, such as would be produced by a handwriting digitizer known in the art. Alternatively, an image could be for example, a spatial array of feature data, such as whorl inclination angle of a fingerprint. It should be apparent to those skilled in the art upon reading the following descriptions that several image types may be used with the invention.

The pixelation process, i.e., forming the image of pixels in accordance with the descriptions above, may be accomplished in a variety of ways known in the art. For example, the electrical signal produced by the biometric input device may be sampled and converted into a digital number in a digital data stream. The numbers of the data stream may then be assigned to pixels of a digital image to produce a digitized copy of the original biometric data supplied by the user through biometric input device 120. Alternatively, pixelator 130 may collect quanta and store an electrical representation of a collected number thereof at individual locations of an array. An example of such a pixelator may be a charge coupled device (CCD). The output of pixelator 130 is then a pixelated image of the biometric data provided by the user.

In certain embodiments of the present invention, the biometric input device 120 and pixelator 130 are combined into a single physical unit. For example, many digitizers used for obtaining handwriting samples are configured to determine the position of a stylus, such as through electromagnetic sensors, when it is in contact with the digitizer pad. The data are presented at an output terminal of the digitizer as a time ordered stream of stylus position data, i.e., the coordinates of the stylus when it is in contact with the pad. The image produced is a stream of stylus position data in a temporal coordinate system. It should be clear to the skilled artisan that such system configurations and images produced thereby fall within the scope of the invention.

The description of digitizers above provides illustration of a concept which requires elaboration. It is to be noted that the same data used to form one image may be presented in an alternative image. For example, the temporally ordered positional data described above may be alternatively presented in a spatially ordered image of pixels containing data corresponding to "stylus up", i.e., not in contact with the pad, or "stylus down", i.e., in physical contact with the pad, in a spatial coordinate system corresponding to the known physical layout of the pad. The values, "stylus up" or "stylus down", may be assigned to a pixel corresponding to the coordinate established by the same stylus position data provided as the pixel value in the temporally ordered image. Thus, it may be beneficial to practice portions of the invention while data are formed in one image representation thereof while other portions of the invention are practiced when the data are formed in an alternative image representation thereof. The actual various image representations will vary by the many different possible implementations of the present invention.

Whereas, it should be clear to the skilled artisan that many image types of many different biometric data may be obtained by the system of FIG. 1, a handwriting sample will be used herein to facilitate the description of various aspects of the present invention. It is to be fully understood, however, that the present invention may be used with many different types of biometric data, and the handwriting sample described should not be construed to limit the scope of the present invention.

System 100 of FIG. 1 includes a processing unit 110 which is coupled to a data storage unit 140 and a code storage unit 150. As their respective descriptions suggest, data storage unit 140 is primarily used for the storage of biometric data and code storage unit 150 is used to store program instruction sequences that, when executed by processing unit 110, implement various procedures for carrying out aspects of the present invention. As is known in the art, data storage unit 140 and code storage unit 150 may actually reside in a single device such as a random access memory (RAM) or hard disk drive. Alternatively, data storage unit 140 and code storage unit 150 may be distributed across several devices. For example, code storage unit 150 may be implemented in a read only memory (ROM) device while data storage unit 140 may be implemented in a hard disk drive. Moreover, either or both of data storage unit 140 or code storage unit 150 may be physically removed from processing unit 110 while still being electrically coupled thereto via a communications network. Thus, as will be clear from the discussion below, the present invention may be implemented through numerous physical configurations of system 100.

System 100, in the exemplary embodiment shown, is operable to obtain biometric image data and extract pertinent features therefrom. The features extracted are particular to the type of biometric data utilized. These features are well known in the art and new features and feature extraction techniques are continuously being developed. Among its many beneficial features, the present invention affords consistent feature extraction that is invariant to the angle of submission of the biometric data.

Figure 2A:
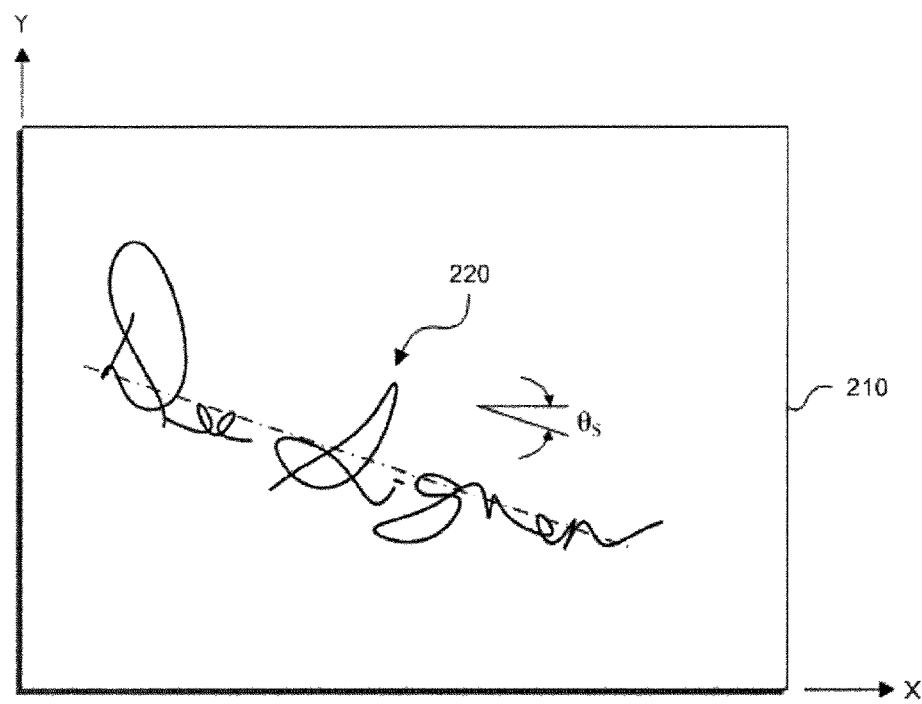
FIG. 2A illustrates a biometric data image of a handwriting sample, or sign, which is oriented in the image at a submission angle.

Referring now to FIG. 2A, there is shown an image 210 of biometric data 220. In the exemplary embodiment shown in FIG. 2A, the biometric data 220 are in the form of a handwriting sample. More specifically, the handwriting sample 220 is a signature of the user. It is to be noted that many other handwriting samples may be used and which qualify as handwriting samples for the purposes of validating a particular user. As such, the signature 220 will be referred to as a sign 220 or handwriting sample 220 to emphasize that the handwriting sample 220 need not be a signature.

As is shown in the Figure, sign 220 exhibits an inclination with respect to the X axis of the image 210. This inclination will be referred to herein as the angle of submission $\theta_s$ or, alternatively, the submission angle $\theta_s$. As previously discussed, a non-zero angle of submission is encountered often in biometric data collection. Clearly, a user cannot be expected to submit a handwriting sample, or place a finger on a touchpad or even hold his head at a particular angle for purposes of retinal scan every time the individual is to provide biometric data for validation. As such, feature extraction for purposes of biometric data validation becomes more difficult.

Among the beneficial features of the present invention is the application of a transform through which a "universal" angle of rotation is applied to the biometric data in the image. The term "universal angle of rotation" is used herein to describe an angle which, after transformation of the image data, the resulting angle of inclination of the biometric data is always the same. In certain embodiments of the invention, the desired inclination is determined by a statistical relationship between pixels of the transformed image. For example, the universal angle of rotation may be determined by the relationship where the variance in pixel values of pixels along the X axis is a scalar multiple of the variance in pixel values of those pixels in the Y direction. In another embodiment, the covariance of pixel values in the X and Y directions are set to a specific value, such as zero. Many other relationships exist and will become apparent to the skilled artisan as the present invention is described and all such relationships are considered to fall within the scope of the present invention.

Consider first an angle of rotation which brings about the relationship var(X)=k×var(Y), where X, Y are coordinates of the rotated image and x, y are the pixel coordinates of the image prior to rotation. Further, assume k=1, i.e., var(X)=var(Y). The present invention then applies a universal angle of rotation to the image data such that thereafter, the statistical relationship var(X)=var(Y) between pixels of the transformed biometric data image will hold, regardless of the angle of submission, $\theta_S$.

In the exemplary embodiment of FIG. 2A, the biometric data image 210 is composed of a rectangular array of pixels distributed in the X and Y directions. It is desired to derive an angle of rotation through which the pixels of the biometric data image are to be rotated such that var(x)=var(y), where (x, y) is the set of transformed coordinates and var(x), var(y) are estimates of the variances of the pixel values in the transformed coordinate system. The desired angle of rotation $\theta = \tan^{-1} M$ will achieve the design goal when M is appropriately chosen.

It is well known that rotation of axes in a Cartesian system is brought about through the relationships $$x_i = \frac{X_i + MY_i}{\sqrt{1+M^2}} \qquad (1)$$

$$y_i = \frac{Y_i - MX_i}{\sqrt{1+M^2}}. \qquad (2)$$

Thus, it is a design goal, to find M such that $$\text{var}(x) = \text{var}((X_i + MY_i)/\sqrt{1+M^2}) = \text{var}(y) = \text{var}((Y_i - MX_i)/\sqrt{1+M^2}). \qquad (3)$$

Simplifying, it is observed that M must provide a solution to $$\text{var}(X_i + MY_i) = \text{var}(Y_i - MX_i). \qquad (4)$$

It is a well known statistical identity that $$\text{var}(X_i + MY_i) = \text{var}(X) + 2M\text{cov}(X,Y) + M^2\text{var}(Y) \qquad (5)$$

and $$\text{var}(Y_i - MX_i) = \text{var}(Y) - 2M\text{cov}(X,Y) + M^2\text{var}(X). \qquad (6)$$

Thus, $$\text{var}(X) + 2M\text{cov}(X,Y) + M^2\text{var}(Y) = \text{var}(Y) - 2M\text{cov}(X,Y) + M^2\text{var}(X) \qquad (7)$$

By gathering terms, a quadratic equation in M is formed:

$$M^2\{\text{var}(Y)-\text{var}(X)\}+4M\text{cov}(X,Y)-\{\text{var}(Y)-\text{var}(X)\}=0. \quad (8)$$

Dividing through by $\sqrt{\text{var}(X)\text{var}(Y)}$ and defining $a=\sqrt{\text{var}(X)/\text{var}(Y)}$ and $r=\text{cov}(X,Y)/\sqrt{\text{var}(X)\text{var}(Y)}$:

$$M^2(a^{-1}-a)+4Mr-(a^{-1}-a)=0. \quad (9)$$

Thus, the universal angle of rotation that ensures the rotated image has the desired statistical relationship between pixels, i.e., var(X)=var(Y) is defined by the relationship $\theta=\tan^{-1} M$, where, $$M = \begin{cases} 0, & a = 1 \\ \dfrac{2ra \pm \sqrt{4r^2a^2 + a^4 - 2a^2 + 1}}{a^2 - 1}, & a \neq 1. \end{cases} \quad (10)$$

As is typical with solutions to quadratic equations, Eq. (10) produces two solutions, one for each of the operations defined by the ± operator. The two solutions provide angles of rotation that are 90° apart, i.e., perpendicular to each other.

Figure 2B:
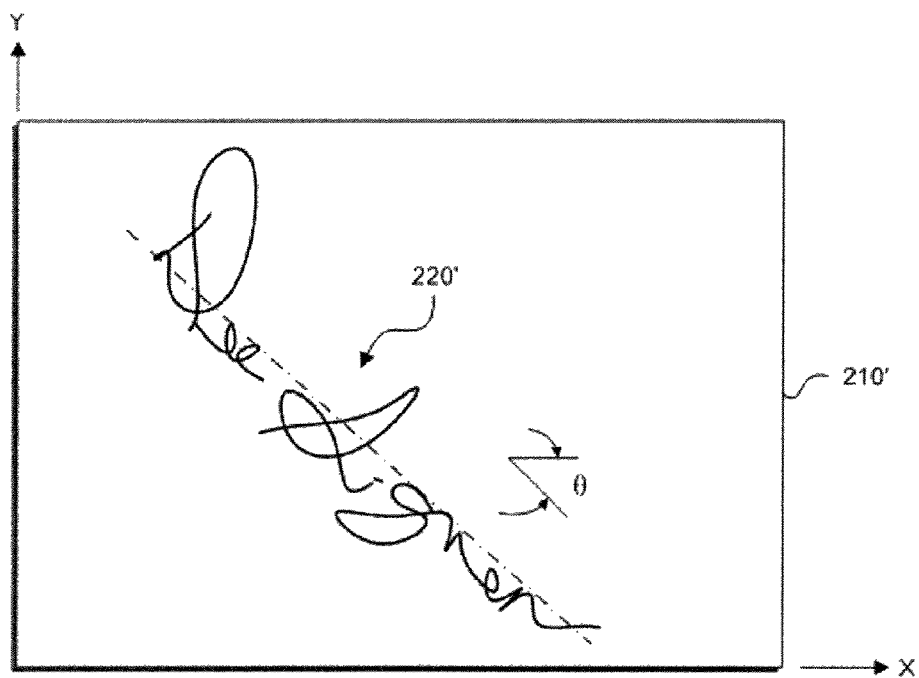
FIG. 2B is an illustration of the user's sign after the transformation in accordance with the present invention.

Referring now to FIG. 2B, there is shown a rotated image 210', in which the user's sign 220' is at the inclination corresponding to the angle of rotation, θ. It is to be noted that this inclination of the sign 220' will be produced by embodiments of the present invention regardless of the angle of submission $\theta_s$ of the user's original sign. Certain embodiments of the present invention analyze the original image of the biometric data 210 to determine the statistical properties thereof and these properties are then utilized to determine the angle of rotation that achieves the desired statistical relationship between pixels in the rotated image 210'. From the rotated image, features may be extracted for purposes of validation, and because the sign 220' is at a consistent inclination with a sign from which template features are extracted, feature recognition and correspondence is improved.

In certain embodiments of the present invention, the relationship between pixels of the rotated image is that where the covariance of the pixels thereof are to be set to some constant value, such as zero. Using the same coordinate transformation described in Eqs. (1) and (2), the $\theta=\tan^{-1} M$ that ensures that cov(x, y)=0, i.e., $$\text{cov}(x, y) = \frac{1}{N}\sum_{i=1}^{N} x_i y_i - \frac{1}{N^2}\sum_{i=1}^{N} x_i \sum_{i=1}^{N} y_i = 0, \quad (11)$$

leads to, $$\frac{1}{N}\sum_{i=1}^{N}\{(X_i + MY_i)(Y_i - MX_i)\} - \frac{1}{N^2}\sum_{i=1}^{N}(X_i + MY_i)\sum_{i=1}^{N}(Y_i - MX_i) = 0. \quad (12)$$

Eq. (12) may be reduced to $$(1-M^2)\left\{N\sum_{i=1}^{N} X_i Y_i - \sum_{i=1}^{N} X_i \sum_{i=1}^{N} Y_i\right\} + \quad (13)$$

$$M\left\{N\sum_{i=1}^{N} Y_i^2 - \left(\sum_{i=1}^{N} Y_i\right)^2\right\} - M\left\{N\sum_{i=1}^{N} X_i^2 - \left(\sum_{i=1}^{N} X_i\right)^2\right\} = 0.$$

If Eq. (13) is divided through by $N^2\sqrt{\text{var}(X)\text{var}(Y)}$, the equation may be reduced to:

$$(1-M^2)r + M\sqrt{\frac{\text{var}(Y)}{\text{var}(X)}} - M\sqrt{\frac{\text{var}(X)}{\text{var}(Y)}} = 0. \quad (14)$$

Setting $a=\sqrt{\text{var}(X)/\text{var}(Y)}$, $$rM^2+M(a-a^{-1})-r=0. \quad (15)$$

Thus, setting cov(x, y)=0 yields two perpendicular solutions, $$M = \begin{cases} 0, & r = 0 \\ \dfrac{(1-a^2) \pm \sqrt{4r^2a^2 + a^4 - 2a^2 + 1}}{2ra}, & r \neq 0 \end{cases} \quad (16)$$

The rotation defined by Eq. (10) may, depending upon the inclination of the biometric data in the original image, produce an inverted image, i.e., 180° to the expected image. However, many key features of biometric data may be defined which are not affected by such an inversion. If features are included which are sensitive to a 180° rotation, those features may be extracted for both the image after applying the universal angle of rotation and its equivalent after rotating the image further through another 180°. The closest match to the data in a biometric template stored in data storage unit 140 can be used for validation purposes.

In accordance with yet another of the beneficial features of the present invention, a further rotation may be imposed on the biometric data after the data has been transformed while maintaining the statistical relationship between pixels. For example, in certain applications, it may be desired to rotate the biometric data to a "natural" state, e.g., one that appears visually natural to an observer. A specific example of this may be where it is desired that the handwriting sample be rotated such that it is parallel to a longitudinal axis of the enclosing image. The additional rotation which retains the previously established statistical relationship may be accomplished through aspects of the invention discussed in paragraphs that follow.

Figure 3A:
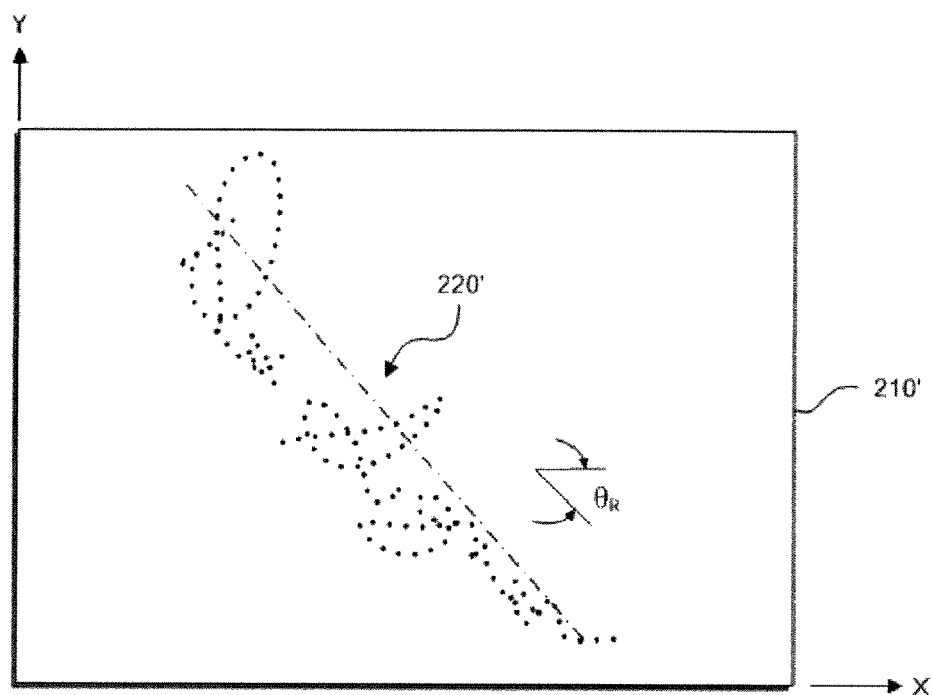
FIG. 3A is an illustration of a pixelated sign after image transformation in which a regression line has been determined.

Referring to FIG. 3A, there is shown the image 210' which has been transformed by the universal rotation angle in accordance with the present invention. The biometric data 220' is illustrated in the Figure as discrete points to emphasize the fact that the data are discrete. A line fitting technique, to be described presently, has produced a fitted line 330 to the data which makes an angle $\theta_R$ with the X axis of the image. It is important to note that $\theta_R$ may not be the same as the inclination angle produced by the transformation which achieves the relationship between pixels of the image. The inclination of the line 330, $\theta_R$, is dependent upon the actual line fitting technique utilized.

After applying the universal angle of rotation according to Eq. (10), the set of pixels at the coordinates (x, y) have the property that var(x)=var(y). A new correlation coefficient for the transformed data set, $r_1$, in terms of the original values of r and a may be defined. From the definition of the correlation coefficient, $$r_1 = \frac{\text{cov}(x, y)}{\sqrt{\text{var}(x)\text{var}(y)}}, \quad (17)$$

and since var(x)=var(y), $$r_1 = \frac{\text{cov}(x, y)}{\text{var}(x)} \quad (18)$$

$$= \frac{\text{cov}(x, y)}{\text{var}(y)}.$$

Since, $$\text{var}(x) = \frac{\text{var}(X) + 2M\text{cov}(X, Y) + M^2\text{var}(Y)}{\sqrt{1 + M^2}} \quad (19)$$

and $$x_i = \frac{X_i + MY_i}{\sqrt{1 + M^2}} \quad (20)$$

$$y_i = \frac{Y_i - MX_i}{\sqrt{1 + M^2}} \quad (21)$$

and using known identities for cov(x, y), $$r_1 = \frac{\frac{1}{N}\sum_{i=1}^{N}(X_i + MY_i)(Y_i - MX_i) - \frac{1}{N^2}\sum_{i=1}^{N}(X_i + MY_i)\sum_{i=1}^{N}(Y_i - MX_i)}{\text{var}(X) + 2M\text{cov}(X, Y) + M^2\text{var}(Y)}. \quad (22)$$

Eq. (22) reduces to $$r_1 = \frac{(1 - M^2)\text{cov}(X, Y) - M\text{var}(X) + M\text{var}(Y)}{\text{var}(X) + 2M\text{cov}(X, Y) + M^2\text{var}(Y)}. \quad (23)$$

Dividing the numerator and denominator of Eq. (23) by $\sqrt{\text{var}(X)\text{var}(Y)}$ results in, $$r_1 = \frac{r(1 - M^2) - Ma + Ma^{-1}}{a + 2Mr + M^2 a^{-1}}. \quad (24)$$

where $a=\sqrt{\text{var}(X)/\text{var}(Y)}$. Multiplying the numerator and denominator of Eq. (24) by a results in, $$r_1 = \frac{ar(1 - M^2) - Ma^2 + M}{a^2 + 2Mra + M^2} \quad (25)$$

or $$r_1 = \frac{M(1 - a^2) + (1 - M^2)ra}{a^2 + 2Mra + M^2}. \quad (26)$$

Figure 3B:
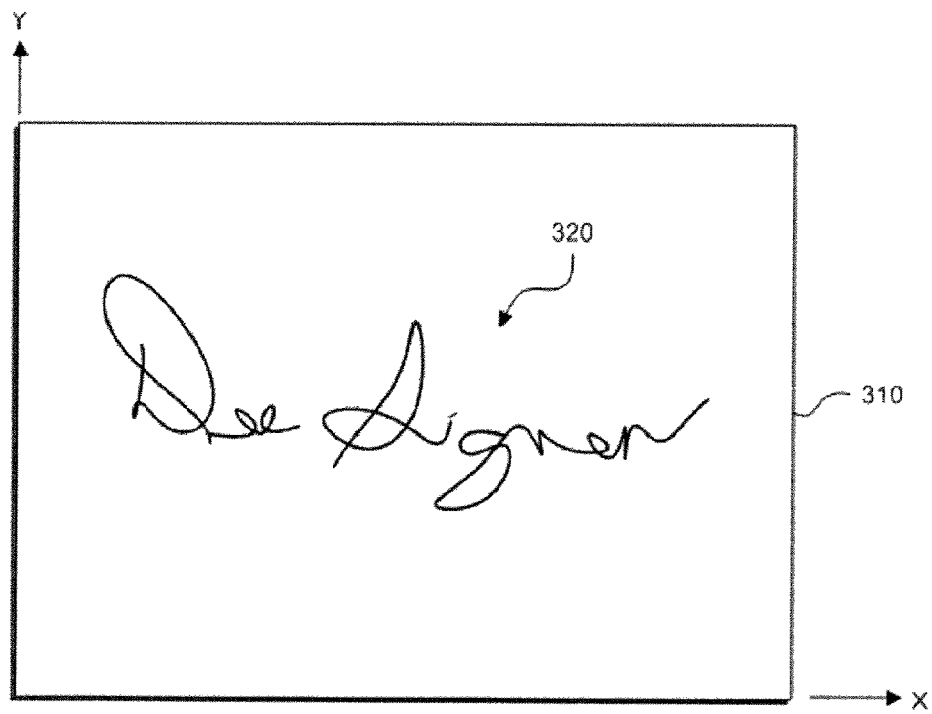
FIG. 3B illustrates a rotated image after a post transformation rotation process.

The angle of inclination of any one image is consistently defined by the chosen statistical relationship between pixels. A further rotation may be applied based upon defining a line of regression (LR) on the rotated data. The resultant angle of rotation, i.e., the universal rotation plus the line of regression rotation, will still preserve the property that the image, irrespective of the initial angle of submission of the biometric data, can be rotated to a consistent angle of inclination. Applying the LR rotation after the universal rotation will generally restore the biometric data to the desired aspect ratio, such as the horizontal aspect ratio of the user sign illustrated in FIG. 3B. As previously stated, the resultant angle of inclination of the biometric data in the image will be dependent upon the equation used for the line of regression and there are numerous methods known in the art.

To illustrate the additional rotation concept, the following least squares estimator minimizes the sum of squared errors of the perpendicular distance from the X, Y pixels onto the line of regression. With var(x)=var(y), the property instilled onto the image after universal rotation, an exemplary LR rotation is defined by the angle $\tan^{-1}m$, where m is the solution to $$2m^3 - m^2(r_1+1) + 2m(r_1+1) - (2r_1+1) = 0. \quad (27)$$

It is a property of Eq. (27) that $-1<m<1$, for all $r_1$, $-1 \leq r_1 \leq 1$. Thus, the LR rotation is between ±45°.

The overall angle of rotation may be given by $\tan^{-1}M_1$, where, $$M_1 = \frac{M + m}{1 - Mm}. \quad (28)$$

The original X, Y axis may then be rotated through an angle θ, generating a new set of pixels in (x, y) using the transformation:

$$x_i = X_i \cos\theta + Y_i \sin\theta \quad (29)$$

$$y_i = Y_i \cos\theta - X_i \sin\theta. \quad (30)$$

where $\theta=\tan^{-1}M$ or $\theta=\tan^{-1}M_1$ and the image will always be rotated to a consistent angle of inclination. The choice between using M or $M_1$ depends upon the actual implementation. Using $M_1$ will generate images with a horizontal aspect ratio and using M will generate images with a square aspect ratio. The values of a and r calculated from the transformed image when the rotation is defined by $M_1$ may be denoted as $a_2$ and $r_2$.

To illustrate the effectiveness of the present invention, five renditions of a sign that were submitted at a significant submission angle (Slanted Sign) were processed by the invention as well as five renditions of the same sign that were not at a significant submission angle (Horizontal Sign). The following table illustrates comparisons through respective correlation coefficients under the following conditions: (1) the image was not rotated, (2) the image was processed by a line of regression technique of the prior art, (3) the image was subjected to the universal rotation transformation of the present invention, and (4) the image was transformed to a universal rotation and then rotated by the LR rotation described above.

TABLE 1

Image Rotation Performance Comparison

| Type of Rotation | Horizontal Sign Correlation Coefficient | Slanted Sign Correlation Coefficient | Difference |
|---|---|---|---|
| None | −0.242 | 0.016 | 0.258 |
| Line of Regression | −0.182 | 0.015 | 0.197 |
| Universal Rotation | 0.303 | 0.221 | 0.082 |
| Universal Rotation/LR | 0.121 | 0.081 | 0.040 |

Figure 4:
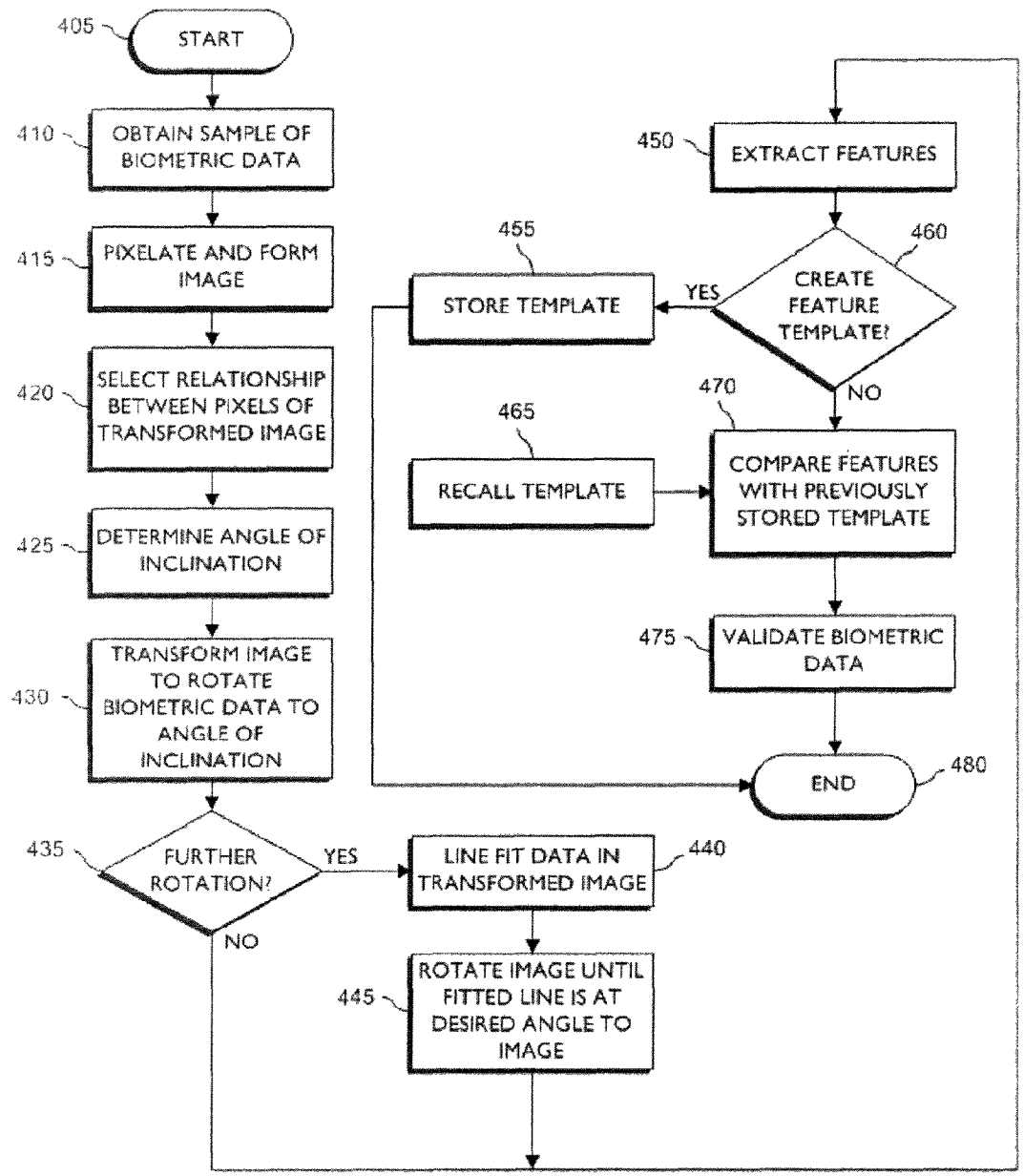
FIG. 4 is a flow diagram of fundamental method steps of an exemplary embodiment of the present invention.

FIG. 4 illustrates via a flow diagram fundamental method steps of certain embodiments of the present invention. The method is entered at start block 405 and flow is transferred to block 410, where a sample of biometric data is obtained via biometric input device 120. As previously stated, the biometric data sample may be a handwriting sample, facial, iris or fingerprint features, or many other biometric quantities. The sample is then pixelated at block 415 and an image is formed from the pixelated data. At block 420, the relationship between the rotated image pixels is selected. Exemplary embodiments previously described have included where the selected relationship is that of equivalent variance of pixel values in orthogonal directions and a zero coefficient of correlation between pixels, but many other relationships exist and may be used with the present invention. From the selected relationship, an angle of rotation may be determined, as shown at block 425, and the image is then transformed to rotate the biometric data to that desired angle of rotation at block 430. When the image has been transformed, the relationship selected at block 420 is in effect.

Once the image of the biometric data has been transformed, it is then decided whether or not further rotation of the image is desired, as shown at decision block 435. If it is decided that the image is to be further rotated, flow transfers to block 440 where a line is fit to the rotated image. At block 445, the fitted line is used as a reference to rotate the image until the desired resulting angle is achieved. Once this has been accomplished, or if further rotation is not necessary, flow is transferred to block 450, at which features of the biometric data are selected, for example, for purposes of identity validation.

When the pertinent features have been extracted at block 450, it is then decided, at decision block 460, whether these features are to be stored in a template for use as reference against subsequent data in validation processes, or if the extracted features are those to be compared with previously stored features. If the features extracted are to be stored as a template for future validation processes, flow is transferred to block 455, where the features are stored, and the process is terminated at block 480. If, at block 460, it is determined that the features are to be compared with stored values, the stored template is retrieved at block 465 and features stored therein compared with the extracted features at block 470. Flow is then transferred to block 475 where the biometric data are validated against the stored values in accordance with the appropriate validation techniques known in the art. The process is then terminated at end block 480.

The descriptions above are intended to illustrate possible implementations of the present invention and are not restrictive. Many variations, modifications and alternatives will become apparent to those skilled in the art upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended Claims, along with their full range of equivalence.

What is claimed is:

1. A method for spatially transforming biometric data for invariant feature extraction comprising the steps of:
   using a processor to perform the following functions:
      acquiring and digitizing biometric information from a user and generating the biometric data responsive thereto;
      pixelating the biometric data to form a biometric image thereof, said image including a plurality of pixels at a corresponding plurality of pixel coordinates of an orthogonal coordinate system, said biometric data oriented in said image at an arbitrary submission angle with respect to a predetermined axis of said image;
      applying a coordinate transformation to said plurality of pixels of said biometric image to form a transformed biometric image, said transformed biometric image remaining substantially invariant for different submissions of said biometric information at variant submission angles, said transformed biometric image being defined according to one of the following characteristics:

$$\mathrm{var}(x_i) = k_1 * \mathrm{var}(y_i), \qquad 1)$$

where "var" is a variance, $k_1$ is a scalar multiple, and $x_i$, $y_i$ represent a plurality of transformed pixel coordinates, such that:

$$x_i = (X_i + M_1 Y_i)/(1+M_1^2)^{1/2}$$

and $$y_i = (Y_i - M_1 X_i)/(1+M_1^2)^{1/2}$$

wherein $X_i$, $Y_i$ represent said plurality of pixel coordinates of said biometric image; and,
wherein for $k_1 = 1$:

$$M_1 = [2ra + \mathrm{or} - \mathrm{Sqrt}(4r^2a^2 + a^4 - 2a^2 + 1)]/(a^2 - 1), \text{ if } a \neq 1$$
and, $$M_1 = 0, \text{ if } a = 1$$

where $a = \mathrm{sqrt}[\mathrm{var}(X_i)/\mathrm{var}(Y_i)]$; and, $r$ is a correlation coefficient of $X_i$ and $Y_i$;

$$\mathrm{cov}(x_i, y_i) = k_2 \qquad 2)$$

where "cov" is a covariance, $k_2$ is a scalar multiple, and $x_i$, $y_i$ represent a plurality of transformed pixel coordinates such that:

$$x_i = (X_i + M_2 Y_i)/(1+M_2^2)^{1/2}$$

and $$y_i = (Y_i - M_2 X_i)/(1+M_2^2)^{1/2}$$

wherein $X_i$, $Y_i$ represent said plurality of pixel coordinates of said biometric image; and
wherein for $k_2 = 0$:

$$M_2 = [(1-a^2) + \mathrm{or} - \mathrm{Sqrt}(4r^2a^2 + a^4 - 2a^2 + 1)]/2ra, \text{ if } r \neq 0$$

and, $$M_2 = 0, \text{ if } r = 0$$

where $a = \mathrm{sqrt}[\mathrm{var}(X_i)/\mathrm{var}(Y_i)]$; and, $r$ is a correlation coefficient of $X_i$ and Yi.

2. The method for spatially transforming biometric data for invariant feature extraction as recited in claim 1, wherein said plurality of pixel coordinates and said plurality of transformed pixel coordinates correspond to Cartesian coordinates of said orthogonal coordinate system.

3. The method for spatially transforming biometric data for invariant feature extraction as recited in claim 1, wherein $k_2$ equals zero.

4. The method for spatially transforming biometric data for invariant feature extraction as recited in claim 1 further including the steps of:
   fitting a line to said pixelated biometric data of said transformed biometric image; and
   rotating said transformed biometric image so that said fitted line is oriented in said image at a predetermined angle with respect to a predetermined axis of said transformed biometric image.

5. The method for spatially transforming biometric data for invariant feature extraction as recited in claim 4 where said line fitting step includes the step of fitting said line using a regression procedure.

6. The method for spatially transforming biometric data for invariant feature extraction as recited in claim 5 where said line fitting step includes the step of establishing a least square estimation as said regression procedure; said estimation including minimizing a summation of squared perpendicular distances from the pixilated biometric data of said transformed biometric image, to said line.

7. The method for spatially transforming biometric data for invariant feature extraction as recited in claim 1, where said acquiring step includes the step of providing a handwriting sample as said biometric information.

8. A method for verifying the validity of biometric data by invariant feature extraction, the method comprising the steps of:
   using a processor to perform the following functions:
     providing an input device for acquiring and digitizing biometric information from a user;
     providing a storage unit for storing features of said biometric information;
     acquiring a first sample of said biometric information from said user and generating a first sample of biometric data responsive thereto;
     pixelating said first sample of biometric data to form a first sample biometric image thereof, said first sample biometric image including a plurality of pixels at a corresponding plurality of pixel coordinates of an orthogonal coordinate system, said first sample of biometric data oriented in said first sample biometric image at an arbitrary first submission angle with respect to a predetermined axis of said first sample biometric image;
     applying a coordinate transformation to said plurality of pixels of first sample biometric image to form a first transformed biometric image, said first transformed biometric image remaining substantially invariant for different submissions of said biometric information at variant submission angles, said transformed biometric image being defined according to one of the following characteristics:

$$\mathrm{var}(x_i) = k_1 * \mathrm{var}(y_i), \qquad 1)$$

where "var" is a variance, $k_1$ is a scalar multiple, and $x_i$, $y_i$ represent a plurality of transformed pixel coordinates, such that:

$$x_i = (X_i + M_1 Y_i)/(1+M_1^2)^{1/2}$$

and $$y_i = (Y_i - M_1 X_i)/(1+M_1^2)^{1/2}$$

wherein $X_i$, $Y_i$ represent said plurality of pixel coordinates of said biometric image; and,
wherein for $k_1 = 1$:

$$M_1 = [2ra + \text{or} - \mathrm{Sqrt}(4r^2 a^2 + a^4 - 2a^2 + 1)]/(a^2 - 1), \text{ if } a \neq 1$$
and, $$M_1 = 0, \text{ if } a = 1$$

where $a = \mathrm{sqrt}[\mathrm{var}(X_i)/\mathrm{var}(Y_i)]$; and, r is a correlation coefficient of $X_i$ and $Y_i$;

$$\mathrm{cov}(x_i, y_i) = k_2 \qquad 2)$$

where "cov" is a covariance, $k_2$ is a scalar multiple, and $x_i$, $y_i$ represent a plurality of transformed pixel coordinates such that:

$$x_i = (X_i + M_2 Y_i)/(1+M_2^2)^{1/2}$$

and $$y_i = (Y_i - M_2 X_i)/(1+M_2^2)^{1/2}$$

wherein $X_i$, $Y_i$ represent said plurality of pixel coordinates of said biometric image; and
wherein for $k_2 = 0$:

$$M_2 = [(1 - a^2) + \text{or} - \mathrm{Sqrt}(4r^2 a^2 + a^4 - 2a^2 + 1)]/2ra, \text{ if } r \neq 0$$
and, $$M_2 = 0, \text{ if } r = 0$$

where $a = \mathrm{sqrt}[\mathrm{var}(X_i)/\mathrm{var}(Y_i)]$; and, r is a correlation coefficient of $X_i$ and $Y_i$;

extracting biometric features from said first transformed biometric image and storing said features in said storage unit;
   acquiring a second sample of said biometric information from said user and generating a second sample of biometric data responsive thereto;
   pixelating said second sample of biometric data to form a second sample biometric image thererof, said second sample biometric image including a plurality of pixels at a corresponding plurality of pixel coordinates of said orthogonal coordinate system, said second sample of biometric data oriented in said second sample biometric image at an arbitrary second submission angle with respect to a predetermined axis of said second sample biometric image;
   applying said transformation to said plurality of pixels of said second sample biometric image to form a second transformed biometric image, said second transformed biometric remaining substantially invariant for different submissions of said biometric information at variant submission angles angle of;
   extracting said biometric features from said second transformed biometric image; and
   comparing said biometric features of said second transformed biometric image to corresponding ones of said features stored in said storage unit.

9. The method for verifying the validity of biometric data by invariant feature extraction as recited in claim 8, wherein said plurality of pixel coordinates and said plurality of said transformed pixel coordinates correspond to Cartesian axes of said orthogonal coordinate system.

10. The method for verifying the validity of biometric data by invariant feature extraction as recited in claim 8, wherein $k_2$ equals zero.

11. The method for verifying the validity of biometric data by invariant feature extraction as recited in claim 8 further including the steps of:

fitting a line to each of said pixelated first biometric data sample and said pixelated second biometric data sample of respectively said first transformed biometric image and second transformed biometric image;

rotating said first transformed biometric image so that said respective fitted line is oriented in said first transformed biometric image at an angle with respect to a predetermined axis thereof prior to said first transformed biometric image feature extraction step; and rotating said second transformed biometric image so that said respective fitted line is oriented in said second transformed biometric image at an angle with respect to a predetermined axis thereof prior to said second transformed biometric data image feature extraction step.

12. The method for verifying the validity of biometric data by invariant feature extraction as recited in claim 11 where said line fitting step includes the step of fitting each said respective line using a regression procedure.

13. The method for verifying the validity of biometric data by invariant feature extraction as recited in claim 12 where said line fitting step includes the step of establishing a least square estimation as said regression procedure; said estimation including minimizing a summation of squared perpendicular distances from the pixilated first and second sample of biometric data to said line.

14. The method for verifying the validity of biometric data by invariant feature extraction as recited in claim 8, where said first sample acquiring step and said second sample acquiring step each includes the step of providing a handwriting sample as said first sample and said second sample, respectively.

15. A system for spatially transforming biometric data for invariant feature extraction, the system comprising:

an input device operable to acquire and digitize biometric information data from a user and generate the biometric data responsive thereto;

a pixelator operable to pixelate said biometric data into an image thereof, said image including a plurality of pixels at a corresponding plurality of pixel coordinates in an orthogonal coordinate system, said biometric data oriented in said image at an arbitrary submission angle with respect to a predetermined axis of said image;

a storage unit operable to store sequences of computer program instructions for a transformation process executable to transform said plurality of pixels of said image into a transformed image, said transformation process involving the solution of a quadratic equation where the equation involves the ratio of variances of the pixel coordinates and a correlation coefficient of the pixel coordinates, said transformed image remaining substantially invariant for different submissions of said biometric information at a plurality of submission angles; and a processing unit coupled to said input device and said storage unit, said processing unit operable to execute said transformation process.

16. The system for spatially transforming biometric data for invariant feature extraction as recited in claim 15, wherein said sequences of computer program instructions executable by the processing unit include:

a line fitting process for fitting a line to said pixelated biometric data of said transformed biometric image; and an image rotation process for rotating said transformed biometric image so that said fitted line is oriented in said image at an angle with respect to a predetermined axis of said rotated transformed biometric image.

* * * * *

UNITED STATES PATENT AND TRADEMARK OFFICE
CERTIFICATE OF CORRECTION

PATENT NO. : 7,916,907 B2
APPLICATION NO. : 12/627413
DATED : March 29, 2011
INVENTOR(S) : Rodney Beatson and Mark A. Kelty It is certified that error appears in the above-identified patent and that said Letters Patent is hereby corrected as shown below:

Column 10, line 30 reads:
"$2m^3 - m^2(r_1+1) + 2m(r_1+1) - (2r_1+1) = 0$"

It should read:
"$2m^3 - m^2(2r_1+1) + 2m(r_1+1) - (2r_1+1) = 0$"

Signed and Sealed this
Tenth Day of April, 2012

David J. Kappos
*Director of the United States Patent and Trademark Office*